Nov. 29, 1949       J. J. DELANY       2,489,623
THROTTLING VALVE

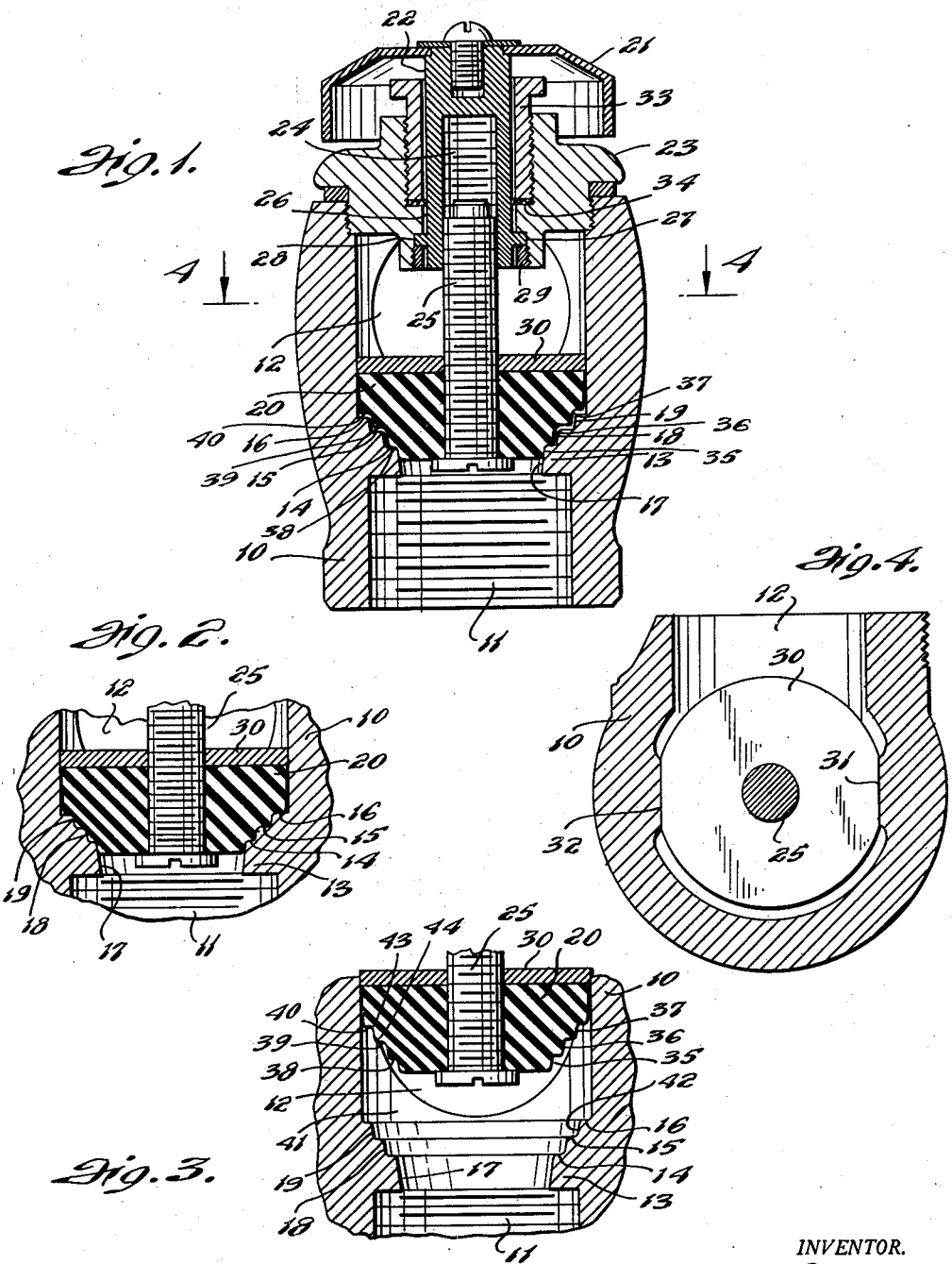

Filed April 14, 1948                    2 Sheets-Sheet 2

INVENTOR.
JOHN J. DELANY
BY
Clark & Ott
ATTORNEYS

Patented Nov. 29, 1949

2,489,623

UNITED STATES PATENT OFFICE 2,489,623

THROTTLING VALVE

John J. Delany, Brooklyn, N. Y., assignor to Delany Realty Corporation, Brooklyn, N. Y., a corporation of New York Application April 14, 1948, Serial No. 20,979

2 Claims. (Cl. 251—27)

1

This invention relates to valves and has particular reference to a valve having improved means for breaking up and retarding the flow of fluid during the closing movement of the valve so as to eliminate the objectionable noise of the fluid passing therethrough and render the valve substantially silent in operation.

An object of the invention is to provide a valve construction for retarding and gradually reducing the flow of the fluid and the pressure thereof during the passage of the fluid through the passageway adapted to be closed by the movable valve element.

Another object of the invention is to provide cooperating stepped surfaces defining valve seats which successively increase the area of the passageway through the valve in the direction of flow of the fluid to thereby reduce the pressure of the fluid and cause the fluid to flow through a devious path between the valve seats and valve element.

Still another object is the provision of a valve having a throttling element and a fluid passageway of cooperating stepped construction which provides successive seating areas for throttling the flow therethrough.

With the foregoing and other objects in view, reference is now made to the following specification and accompanying drawings in which the preferred embodiment of the invention is illustrated.

In the drawings:

Fig. 1 is a vertical sectional view of a valve constructed in accordance with the invention and illustrating the valve element in partially seated relation.

Fig. 2 is a vertical fragmentary view illustrating the valve element in fully closed relation.

Fig. 3 is a similar view showing the valve element in fully opened relation.

Fig. 4 is a horizontal fragmentary sectional view taken approximately on line 4—4 of Fig. 1.

Figure 5:
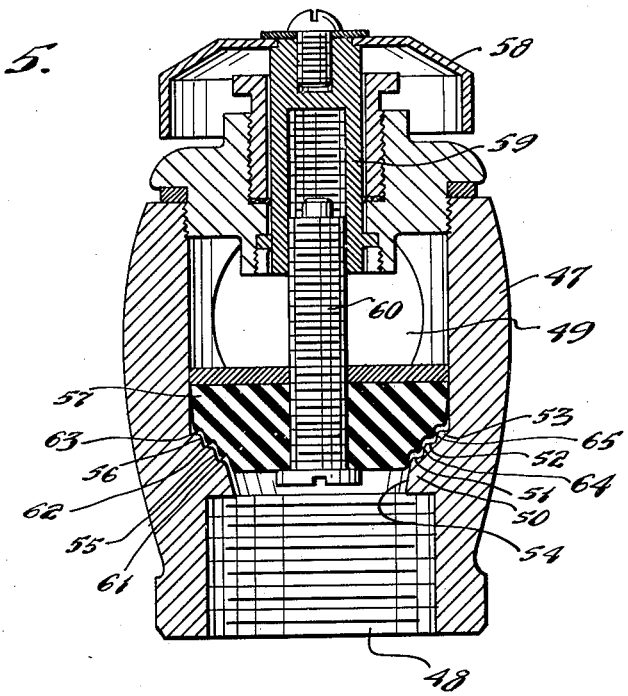
Fig. 5 is a view in vertical section of a valve embodying a modified form of the invention.

Referring to the drawings by characters of reference, the invention is illustrated in its application to a valve of the type having a closure which is manually reciprocated into and out of closing relation so as to respectively close off and open the passageway therethrough. The invention is applicable to valves of the type having closures for completely closing off the flow of the fluid and for regulating the flow therethrough

2 and in which it is essential that the noise produced by the flow of the fluid be substantially eliminated in order that the valve be silent in operation.

As illustrated in Figs. 1 to 4 inclusive of the drawings the valve consists of a casing 10 having inlet and outlet openings 11 and 12 which communicate with the hollow interior of the valve. Intermediate the inlet and outlet openings, the valve casing is formed with an inwardly directed apertured partition 13 defining a passageway through the valve between the inlet and outlet openings and which is provided with a plurality of concentric annular seats 14, 15 and 16 arranged in stepped relation with the seat 14 disposed innermost and the seat 16 outermost while the seat 15 is arranged therebetween. The said partition is formed with an inverted frusto-conical peripheral wall portion 17 located between the inner edge of the seat 14 and the under side of said partition and which forms the narrowest or most reduced portion of the said passageway. The partition is also provided with an inverted frusto-conical peripheral wall portion 18 disposed between the outer edge of the annular seat 14 and the inner edge of the annular seat 15, and between the outer edge of the annular seat 15 and the inner edge of the annular seat 16 the partition is formed with an inverted frusto-conical peripheral wall portion 19. Constructed in this manner, the inner periphery of said partition is inclined inwardly and downwardly in stepped relation so as to increase the size of the passageway through the partition in the direction of flow of the fluid.

A reciprocatory closure member 20 is provided which is movable toward and away from the partition 13 for closing and opening the valve by rotation of a handle member 21. The handle member 21 is secured to the protruding outer end of a cylindrical member 22 mounted for swivel turning movement in a screw cap 23 threadedly secured in and closing the upper end of the casing 10. The cylindrical member 22 is provided with a threaded bore 24 extending inwardly from the inner end thereof in which is threadedly engaged the upper end of a threaded stem 25 having the closure member 20 secured to the lower end thereof. The cylindrical member 22 extends through the central opening 26 in the cap 23 and is provided with an outwardly projecting flange 27 disposed between the inner end of an enlarged annular recess 28 and a tubular bushing 29 threadedly secured in the outer end of said recess to thereby retain the cylindrical member 22 in position and permit of swivel turning movement thereof with reference to the cap so as to retract the upper end of the stem 25 upwardly in the threaded recess 24 by turning of the handle 21 in one direction and downward movement of the stem 25 by turning of the handle member 21 in the opposite direction.

The closure member 20 is reciprocated in accordance with the movement of the stem 25 and the same is secured thereon between the headed lower end thereof and a plate 30 threadedly secured on said stem and having oppositely disposed parallel side edge portions 31 slidably engaging the oppositely disposed faces 32 formed on the inner wall of the casing 10 and defining guides for preventing turning movement of the stem 25. The cap 23 is provided with a threaded bushing 33 disposed in surrounding relation with the cylindrical member 22 and which engages against packing 34 at the inner end thereof for preventing leakage about the cylindrical member 22.

The closure member 20 is fashioned of flexible resilient material such as rubber composition and is constructed so as to successively engage the annular seats 14, 15 and 16 to thereby gradually reduce the flow of the fluid and the pressure thereof. The closure member 20 is formed with a series of inverted frusto-conical peripheral wall portions 35, 36 and 37 and parallel concentric face portions 38, 39 and 40 located between the adjacent frusto-conical portions respectively. The frusto-conical wall portions 35, 36 and 37 are adapted to successively engage the peripheral wall portions 17, 18 and 19 of the partition 13 while the concentric face portions 38, 39 and 40 are adapted to successively engage the annular seats 14, 15 and 16.

In order to cause said portions to successively engage, the annular face 38 of the closure member 20 is slightly narrower than the annular seat 14 of the partition 13, and the peripheral wall portion 36 of the closure member 20 is slightly deeper than the peripheral wall portion 18 of said partition. This construction produces a narrowing of the passageway between the closure member 20 and the partition 13 during the closing movement of the closure member or when the same approaches engagement with the partition 13 so that the volume of the flowing fluid and the pressure thereof is considerably reduced when the innermost annular seat 14 is about to be engaged by the annular face portion 38 of the closure member 20. The reduction of the volume of flowing fluid and the pressure thereof materially reduces the noise or squeal produced by the flowing fluid and renders the valve substantially silent in operation.

As illustrated in Fig. 1 of the drawings, the annular face 38 of the closure member 20 will be the first to engage the partition 13 and when engaged on the annular seat 14 thereof, the remaining upper confronting portions of the partition and seat are spaced apart. Further downward movement of the closure member 20 produces a resilient outward spreading thereof so that the seats 15 and 16 are successively engaged to thereby completely close off the valve.

The junctures of the annular seats 14, 15 and 16 with the peripheral wall portions of the partition 13 are rounded or beveled as illustrated at 41 and 42 in Fig. 3, while the junctures of the annular faces 38, 39 and 40 with the peripheral wall portions of the closure member 20 are similarly beveled or rounded as shown at 43 and 44.

In the form of the invention illustrated in Fig. 5 of the drawings, the valve similarly consists of a casing 47 having inlet and outlet openings 48 and 49 which communicate with the hollow interior of the valve and between the said openings the casing is formed with an inwardly directed apertured partition 50 defining a passageway therethrough. The partition 50 is provided on the upper face thereof with a series of concentric valve seats 51, 52 and 53 arranged in stepped relation between the inner wall of the casing and the peripheral wall 54 defining the passageway through the lower portion of said partition. Adjacent annular seats 51, 52 and 53 are joined by inverted frusto-conical peripheral wall portions 55 and 56 so as to provide a passageway through the upper portion of the partition 50 which increases in size in the direction of the flow of the fluid through the valve. The valve is also provided with a reciprocatory closure member 57 which is moved toward and away from the partition wall 50 by turning of a handle member 58, the closure member being secured to the lower end of a stem 59 threadedly engaged at its upper end in a cylindrical member 60 similar to the cylindrical member 22 in the previous form of the invention for retracting the stem 59 upwardly therein by turning of the handle member 58 in one direction and moving the same downwardly therefrom by turning of the handle member 58 in the opposite direction.

The reciprocatory closure member 57 is also formed with a series of concentric annular faces 61, 62 and 63, adjacent faces being connected by inverted frusto-conical peripheral wall portions 64 and 65 to provide a stepped construction adapted to engage the aforesaid annular seats and peripheral wall portions of the partition 50 for closing the valve.

In this form of the invention, the annular faces 61, 62 and 63 of the closure member 57 are equally spaced from the annular seats 51, 52 and 53 when the closure member is moved toward the partition 50 so that said annular faces simultaneously engage the said valve seats respectively. This construction produces a narrow passageway between the partition 50 and the closure member 57 as the same approaches engagement with said partition as illustrated in Fig. 5 so that the volume of the fluid passing therethrough and the pressure thereof is considerably reduced during the closing movement of the closure member whereby the fluid flows through said restricted passageway without appreciable noise.

Figure 6:
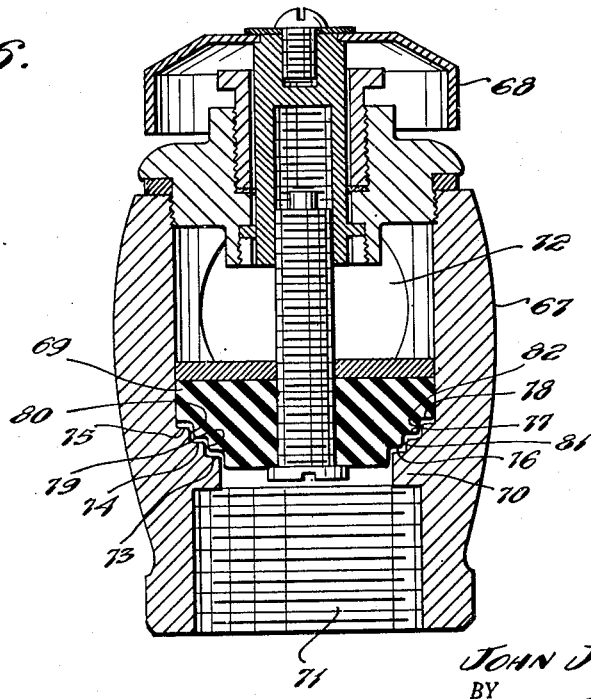
Fig. 6 is a similar view of still another modified form of the invention.

In the form of the invention illustrated in Fig. 6 of the drawings, the valve includes a casing 67 similar to the casing shown in the previous form of the invention, the same being provided with a handle member 68 for moving the closure member 69 toward and away from a partition 70 disposed between the inlet and outlet openings 71 and 72 similar to the movement of the closure members in the previous forms of the invention. In this form however, the partition 70 is formed with a plurality of concentric annular seats 73, 74 and 75 disposed in stepped formation while the closure member 69 is formed with annular faces 76, 77 and 78 adapted to simultaneously engage the valve seats 73, 74 and 75 respectively.

In this form of the invention also the inner peripheral wall portions 79 and 80 between adjacent valve seats 73, 74 and 75 and the peripheral wall portions 81 and 82 between adjacent annular faces 76, 77 and 78 respectively are of cylindrical formation instead of the frusto-conical formation shown in the previous forms of the invention. This construction also provides a narrow stepped passageway between the partition 70 and the closure member 69 when the closure member is moved to adjacent relation therewith to thereby reduce the volume of the fluid and to break up the solid formation thereof by the stepped formation of the valve seats and closure member which causes the fluid to pass through a devious expanding passageway therebetween similar to the passage of the fluid through the construction shown in the previous forms of the invention. In this form of the invention as well as in the form illustrated in Fig. 5, the annular seats as well as the annular faces of the closure members are provided with curved or beveled edges.

What is claimed is:

1. In a valve, a valve casing having inlet and outlet openings communicating with the interior of the casing, an apertured partition located within said casing between said inlet and outlet openings and defining a passageway for the flow of fluid, said partition having a plurality of annular faces on the upper surface thereof defining valve seats arranged in stepped relation with the axis of the passageway extending through the centers thereof, said annular seats successively increasing in diameter in the direction of the flow of fluid, a resilient closure member mounted for reciprocatory movement toward and away from said partition, said closure member having a plurality of annular faces on the under side thereof arranged in stepped relation with the axis of said closure member extending through the centers thereof, the uppermost faces of said closure member being spaced apart a greater distance than the spacing of the faces of said partition whereby the faces of said closure member are adapted to successively seat on the faces of said partition by the resilient expansion of the closure member when compressed against said partition for closing off the flow of the fluid through the valve and said faces providing a narrow outwardly expanding stepped annular passageway between said closure member and said partition as the closure member approaches engagement therewith to thereby gradually reduce the flow and pressure of the fluid during the closing movement of the closure member.

2. In a valve, a valve casing having inlet and outlet openings communicating with the interior of the casing, an apertured partition located within said casing between said inlet and outlet openings and defining a passageway for the flow of fluid, said partition having a plurality of annular faces on the upper surface thereof defining valve seats arranged in stepped relation with the axis of the passageway extending through the centers thereof, said annular seats successively increasing in diameter in the direction of the flow of fluid and adjacent seats being connected by inverted frusto-conical wall portions at the inner periphery of said partition, a resilient closure member mounted for reciprocatory movement toward and away from said partition, said closure member having a plurality of annular faces on the under side thereof arranged in stepped relation with the axis of said closure member extending through the centers thereof, the annular faces of said closure member successively decreasing in diameter toward the inner end of said closure member and adjacent faces thereof being connected by inverted frusto-conical wall portions at the outer periphery of said closure member, the uppermost faces of said closure member being spaced apart a greater distance than the spacing of the faces of said partition whereby the faces of said closure member are adapted to successively seat on the faces of said partition by the resilient expansion of the closure member when compressed against said partition for closing off the flow of the fluid through the valve and said faces providing a narrow outwardly flaring stepped annular passageway between said closure member and said partition as the closure member approaches engagement therewith to thereby gradually reduce the flow and pressure of the fluid during the closing movement of the closure member.

JOHN J. DELANY.

REFERENCES CITED

The following references are of record in the file of this patent:

UNITED STATES PATENTS

| Number | Name | Date |
| --- | --- | --- |
| 112,047 | Johnson | Feb. 21, 1871 |
| 405,404 | Forestier | June 18, 1889 |
| 1,193,849 | Viger | Aug. 8, 1916 |
| 1,202,044 | Fisher | Oct. 24, 1916 |
| 2,107,200 | Kennon | Feb. 1, 1938 |